April 21, 1964 R. D. COLLINS 3,129,768
HELICOPTER POWER REQUIREMENT ANTICIPATOR
AND THROTTLE GOVERNOR DAMPER
Filed May 3, 1961 2 Sheets-Sheet 1

INVENTOR.
Richard D. Collins
BY Bialos & Schlemmer
Attorneys

INVENTOR.
Richard D. Collins
BY
Bialos & Schlemmer
Attorneys

United States Patent Office 3,129,768
Patented Apr. 21, 1964

3,129,768
HELICOPTER POWER REQUIREMENT ANTICI-
PATOR AND THROTTLE GOVERNOR DAMPER
Richard D. Collins, Menlo Park, Calif., assignor, by mesne
assignments, to Eltra Corporation, Brooklyn, N.Y., a
corporation of New York
Filed May 3, 1961, Ser. No. 107,495
2 Claims. (Cl. 170—135.73)

This invention relates generally to a control system for a helicopter. More particularly this invention relates to a governor control system for a helicopter which includes means for anticipating changes in the power requirement of the helicopter power source resulting from changes being made in the collective pitch setting of the helicopter rotor blades, such means also providing for damping of the governor of the helicopter control system.

That is, this invention relates to damping and motion transmitting means, in conjunction with the collective pitch change mechanism of the helicopter, which is responsive to movement of the pilot operable collective pitch control member to effect modification of the setting of the throttle valve of the helicopter power source prior to the time such throttle valve setting normally would be modified by a conventional governor of the helicopter control system.

A further feature of importance in this invention includes the fact that upon movement of the pilot operable pitch control member, productive work is thereby introduced directly into the system. This reduces the work output requirement of the governor for regulating the power source of the helicopter so that a governor may be employed possessing lower output potential than would normally be required.

It is well known in the helicopter art to employ speed governors in conjunction with and operatively connected to the power source of the helicopter, such as a standard internal combustion engine, or the like, frequently employed therewith. Such a governor is intended to control the power output or drive shaft speed of such an engine and to thereby regulate within predetermined limits the speed of rotation of the helicopter rotor. However, it has been found that governors generally employed do not modify the engine power output sufficiently fast when a change is required so that a response time lag results. That is, under changing flight conditions, such as when the pilot collectively changes the pitch of the rotor blades of the helicopter rapidly so that the output power requirement of the engine is also modified, the governor normally does not respond until the engine r.p.m., due to the changed engine power load requirements, has changed a generally significant amount.

In this connection, should the pilot of the helicopter change the blade collective pitch setting to increase the same so that the helicopter may attain increased elevation, such pitch change tends to decrease the engine output r.p.m. because of the increased load thus placed upon the engine due to the increased blade pitch. While the governor is intended to increase the engine power output in such a situation by automatically opening the engine throttle valve so that additional power is supplied to the rotor to maintain the rotor speed substantially constant during such changing conditions involving collective pitch, as noted previously, generally a significant time lag results between the time at which the governor senses the requirement for increased power and the time at which the governor acts on the throttle of the engine to supply such increased power. In this connection, many governors available will not react until the engine r.p.m. change is substantial, for example of the order of three to five percent of a predetermined value, so that a substantial response time lag results.

Conversely to the above situation, upon the rotor blade collective pitch setting being decreased, the engine output r.p.m. tends to increase due to the decreased load requirements placed on the engine. However, generally a significant time lag will exist between the time at which the governor senses the reduced power requirements and the time when the governor acts on the engine throttle to decrease the power output of the engine.

A primary purpose of this invention resides in the incorporation in a helicopter control system of means in conjunction with the helicopter engine throttle for anticipating the need for changed power requirements on the engine so that the aforementiond time lag may be substantially eliminated. That is, this invention embodies means for substantially instantaneously modifying the setting of the throttle valve of the engine power source of the helicopter in substantially direct and proportional response to rapid change in the collective pitch setting of the helicopter rotor blades. Additionally, this invention relates to means in conjunction with the governor for introducing work directly into the control system and for damping the governor to preclude the same from reacting rapidly and unduly upon erratic flight situations occurring when collective pitch of the rotor blades is not intentionally changed by the pilot.

Accordingly, objects of the present invention include the provision in a helicopter control system of means for increasing the speed of governor response in conjunction with rapid changes in collective pitch settings; the provision of means in a helicopter governor control system to furnish governor damping; the provision of means to reduce the governor work output requirements; and the provision of motion transmitting means of a fluid coupling nature interposable between a helicopter power source throttle valve and governor and the helicopter collective pitch control member incorporated therewith for anticipating engine power output requirements.

These and other objections of the invention will become apparent from the following disclosure, in which reference is directed to the accompanying drawings.

As noted previously, governors commonly employed on helicopters are intended to control the engine power output or drive shaft r.p.m., and through such control to regulate the rotor r.p.m. so that the rotor may be rotated at substantially constant speed during varying flight situations. However, normally governors will not correct fully until the rotor r.p.m. and the engine r.p.m. have varied a substantial amount from a predetermined speed. Furthermore, such correction generally is accomplished only after the governor has hunted or searched for the proper throttle valve setting. As a result, a definite time lag generally occurs between the time of changed rotor speed conditions and the time the governor effects a new throttle valve setting to compensate therefor in a manner well known.

By adding the fluid coupling or motion transmitting means, to be described, to the helicopter control system the lag time mentioned may be substantially eliminated so that upon rapid changes being made in the blade collective pitch setting, rapid changes in the engine throttle valve setting are similarly and automatically effected so that proportional and rapid engine power output changes are made. That is, the subject fluid coupling means anticipates the power requirement to be placed on the engine and effects appropriate changes in the throttle valve setting. This permits the use of governors of a less expensive nature in that the requirements placed upon the governor in sensing and compensating for changes in rotor and engine r.p.m. are not so great.

The subject control system comprises linear fluid coupling means, including structure or mechanism which is operatively interposed between the rotor blade collective pitch control member and the governor or the throttle valve of the engine. Because the helicopter main rotor absorbs most of the engine power output, changes in collective pitch result in proportional changes in the engine power output requirements. By means of the system to be described, a rapid increase in rotor blade collective pitch applies a proportional opening force to the throttle valve and governor system, and vice versa.

Figure 1:
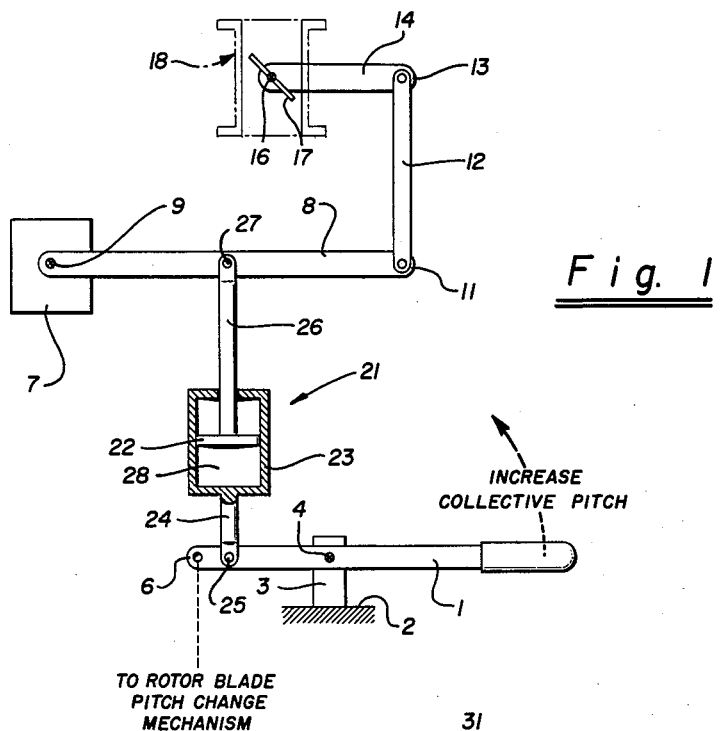
FIG. 1 is a generally schematic view of one preferred embodiment of the subject invention.
Figure 3:
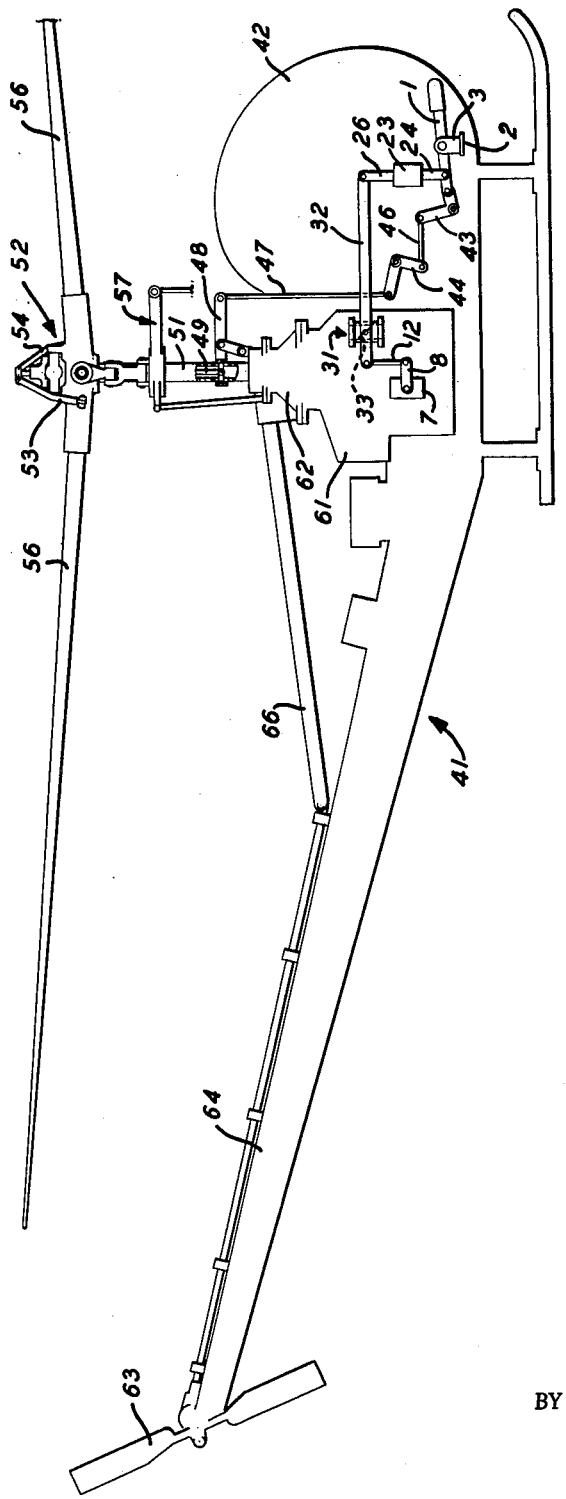
FIG. 3 is a generally schematic view of a helicopter illustrating a control system of the type shown in FIG. 2 operatively interposed between the engine of the helicopter which drives the rotors and mechanism for collectively modifying the pitch of the blades of the helicopter lift rotor.

As seen generally schematically in FIG. 1, the subject system includes, in combination with a helicopter, a conventional pilot operable control member or collective pitch control stick 1 pivotally mounted to the frame 2 of the helicopter in any suitable manner, such as by means of a supporting brace 3 from which a mounting and pivot pin 4 extends. As schematically seen in FIG. 1, one end 6 of the control member is operatively connected to the rotor blade pitch change mechanism in the well known manner. Because this phase of the collective pitch control operation is conventional and may be accomplished in various known manners, details thereof have been described hereinafter only generally with respect to an exemplary and generally schematic collective pitch change linkage arrangement illustrated in combination with one embodiment of the subject control system as seen in FIG. 3.

Forming part of the control system is a conventional engine power output control governor 7 which has operatively connected therewith and extending therefrom a governor arm 8. One end of the arm 8 is pivotally connected by pivot pin 9 to the governor control mechanism in the well known manner, whereby operation of the governor will effect rotation of the governor arm in a predetermined direction about the axis of pin 9. Pivotally connected to the opposite end 11 of governor arm 8 is a connecting link 12 which, at its upper end, is pivotally connected to one end 13 of an engine throttle arm 14, which in turn is pivotally mounted for movement about the axis of a pivot pin 16.

Secured to throttle arm 14 for movement therewith about the axis of pin 16 is a butterfly member 17 positioned in the throttle valve of carburetor 18 of the helicopter engine. The butterfly member 17 forms part of the throttle valve of the engine and, upon pivotal movement of the throttle arm 14 in a predetermined direction, the butterfly member is rotated within the carburetor 18 to open or close the throttle in the well known manner. That is, upon movement of throttle arm 14 about the axis of pivot 16 in the clockwise direction, the throttle opening will be increased, while movement of throttle arm 14 in the counter-clockwise direction will effect closing of the throttle.

As is well known, the function of governor 7 is to regulate engine power output by effecting rotation of governor arm 8 in a predetermined clockwise or counter-clockwise direction in response to increased or decreased engine power output requirements. This in turn effects opening or closing of the throttle valve by pivoting throttle arm 14 in the clockwise or counter-clockwise direction described previously.

As noted previously, governors of a type generally employed are not capable of rapidly anticipating changed engine power requirements without attendant time lag and accompanying r.p.m. change in response to change of rotor blade collective pitch settings. Therefore, in this invention coupling means is provided in conjunction with the governor and the throttle valve for anticipating such power requirement changes.

As seen in FIG. 1, such coupling means comprises a linear fluid coupling structure which includes a fluid cylinder and piston mechanism, generally designated 21. Such mechanism includes a piston 22 slidably received in a cylinder 23 to one end of which is connected a motion transmitting arm 24 which is pivotally connected at 25 adjacent the aforementioned end 6 of the pilot operable collective pitch control member 1. Piston 22 in turn is pivotally connected by a piston rod 26 intermediate the opposite ends of governor arm 8 by a pivot pin 27.

Any suitable fluid may be employed in cylinder 23 for transmitting motion from the control member 1 to the piston rod 26 and therethrough to the governor arm 8 and throttle arm 14 in response to rapid movement of control member 1. That is, a suitable hydraulic liquid, such as oil, or air may be employed as a motion transmitting medium. In this regard, the use of air may be preferred because in such case the cylinder need not be fluid tight, as is true of the cylinder when the same is employed in a hydraulic system.

It should be understood that piston 22 conforms generally to the internal shape of the cylinder 23 but that sufficient clearance exists between the outer periphery of the piston and the inner periphery of the cylinder walls so that the fluid, either air or hydraulic liquid, in cylinder chamber 28 may pass between the piston and the cylinder inner walls.

Hereinafter for convenience and because of the governor damping function performed thereby, the piston and cylinder described will be referred to as a dash pot.

In operation the invention works as follows: by way of example, upon the helicopter pilot lifting the control member 1 to pivot end 6 thereof downwardly as viewed in FIG. 1, the collective pitch of the rotor blades will be increased through the conventional pitch change mechanism mentioned previously. If such pivotal movement of the collective pitch control member is made gradually and relatively slowly, the dash pot will have substantially no effect on the governor system in that the cylinder 23 will be moved downwardly with end 6 of the control member in gradually and relatively slow fashion. This will permit the fluid in the cylinder chamber 28 to either escape from the cylinder, if air is used, or to flow around the piston, if hydraulic fluid is used, without thereby affecting or altering the basic governor output r.p.m. control function. The same situation will exist if the pitch control member is gradually moved downwardly to decrease blade collective pitch.

In distinction, however, upon rapid or abrupt movement of the collective pitch control member upwardly to rapidly change collective blade pitch, fluid on top of the piston will be compressed, if a closed cylinder is employed, and a vacuum will be set up in the lower portion of the cylinder chamber 28 so that the piston will be drawn downwardly with the cylinder in response to such rapid upward movement of the control member. Such downward movement of the piston with the cylinder will draw piston rod 26 downwardly also which will effect pivotal movement of governor arm 8 in the clockwise direction about the axis of governor pivot pin 9. This in turn will open the engine throttle valve in the manner described previously an amount proportional to the amount of movement of the collective pitch control member.

As a result, upon rapid increase in collective pitch being imparted to the rotor blades by the control member 1, the dash pot will effect substantially instantaneous change in the throttle valve setting to produce the requisite increase engine power output. That is, the dash pot actually anticipates the requirement of the engine and effects a change in the engine throttle valve setting prior to the time in which the governor would be capable of operating to effect such a change.

Conversely to the situation described above, upon the collective pitch control member being rapidly depressed to decrease blade collective pitch, the fluid in the lower portion of the cylinder 28 will be compressed thereby urging the piston and piston rod upwardly so that the governor arm 8 will be pivoted counter-clockwise to close the throttle valve an amount proportional to the amount of movement of the collective pitch control member. From the foregoing, it should be understood that the dash pot construction employed permits direct pilot control, through selective movement of the collective pitch change stick 1, to be superimposed over the control effect of the engine governor 7 for directly effecting rapid engine throttle valve setting changes during changing flight conditions.

A further important function of the dash pot is its ability to act as a governer damper by precluding the governor from acting too rapidly, such as upon erratic flight situations occurring, when the collective pitch control member is located in a predetermined position when no pitch change is being effected by the pilot. That is, because the governor arm is directly connected with the dash pot, if the tendency of the governor is to modify too rapidly the power output of the engine, the dash pot acts as a damper to control transient governor response. By way of example, upon the governor functioning in response to rapid changes in engine power requirements, the dash pot functions as a damper to minimize governor hunting or searching for the proper engine throttle valve setting.

Accordingly, the dash pot performs the dual function of anticipating the power output requirement of the helicopter engine, and of providing a damper for the governor.

Figure 2:
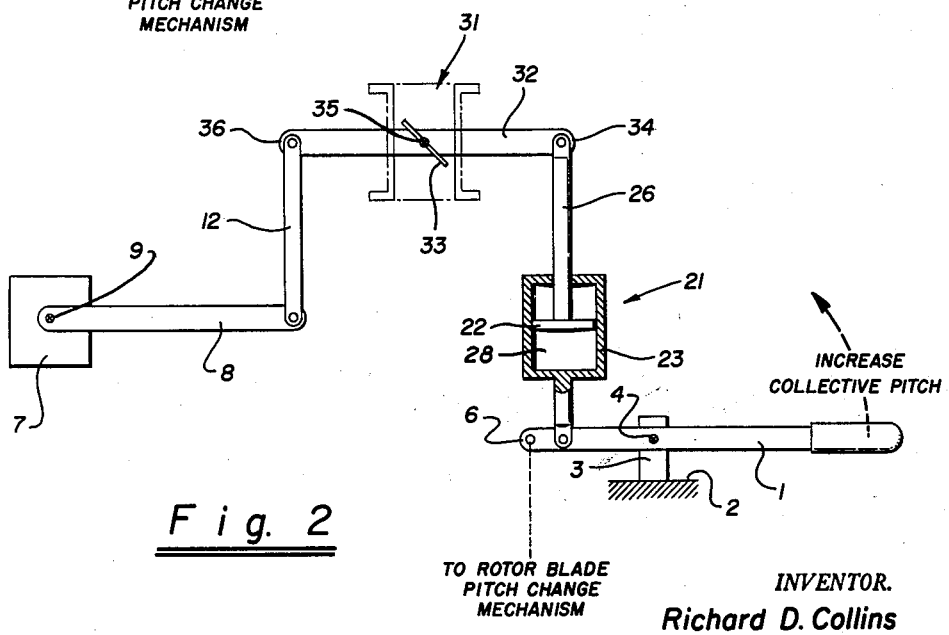
FIG. 2 is a generally schematic view of a somewhat modified embodiment of the subject invention.

The control system schematically illustrated in FIG. 2 is of generally the same construction as that described previously with respect to FIG. 1. However, the dash pot structure 21 in this modified arrangement is not directly connected to the governor arm 8 in the manner described previously. As a result, the collective pitch control member is operatively connected to the engine throttle valve of carburetor 31 in a slightly different fashion.

A throttle arm 32 to which a butterfly member 33 is secured is pivotally connected directly to the piston rod 26 of the dash pot at one end 34 of the throttle arm. The throttle arm is pivotally mounted by a pivot pin 35 which extends through the carburetor substantially in line with the butterfly member. The other end 36 of the throttle arm is pivotally connected to link 12, which in turn is pivotally connected to the governor arm 8 projecting from and operatively connected with governor 7.

Operation of this modified construction is substantially the same as that described previously with rapid movement of the collective pitch control member upwardly to increase blade collective pitch resulting in downward movement of piston rod 26 to effect clockwise rotation of governor arm 32 to open the butterfly member 33 an amount proportional to the amount of movement of the control member. Conversely, rapid movement of the collective pitch control member downwardly will raise piston rod 26 and result in a counter-clockwise rotation of arm 32 to effect closing of the throttle valve an amount proportional to the amount of movement of the control member. With this modified arrangement also, direct pilot control of the engine throttle valve setting is superimposable selectively over the governor control for the engine throttle valve setting. As in the embodiment of FIG. 1 gradual movement of the control member will have substantially no effect on the throttle valve setting.

One distinction of the embodiment of FIG. 2 over the embodiment of FIG. 1 resides in the fact that to effect opening of butterfly member 33, the governor must rotate governor arm 8 counter-clockwise about pivot pin 9; while clockwise rotation is required to close the butterfly member. The converse, as described previously, is true of the FIG. 1 embodiment.

However, in each of the modifications illustrated in FIGS. 1 and 2, the dash pot coupling structure is interposed operatively between and interconnects the governor and throttle valve of the engine with the collective pitch control member.

FIG. 3 shows one of the two previously described embodiments of this subject control system generally schematically associated with a helicopter construction, generally designated 41. In this connection, the embodiment of the control system illustrated in FIG. 2 for purposes of illustration has been shown in specific combination with the subject helicopter construction.

The exemplary helicopter 41 illustrated includes a pilot's station 42 at which the aforementioned collective pitch control stick 1 is pivotally mounted as described previously. In the exemplary arrangement shown, the collective pitch control stick is operatively connected through a simple mechanical linkage mechanism to the lift rotor of the helicopter.

This linkage arrangement comprises a first pivotally mounted bell crank 43 which is operatively connected with a second pivotally mounted bell crank 44 by a connecting link 46. Bell crank 43 is pivotally connected with the control stick 1, while bell crank 44 is pivotally connected with the lower end of an upright push-pull rod 47 which in turn is connected to any suitable collective pitch change mechanism for a helicopter. The exact type of pitch change mechanism chosen may vary to meet a given purpose. In the helicopter embodiment shown in FIG. 3, a collective pitch change arrangement of the type shown in applicant's assignee's Patent No. 2,534,353, dated December 19, 1950, has been shown as exemplary of one type of mechanism which may be employed with the subject control system.

As shown in detail in that patent, aforementioned rod 47 is pivotally connected with a pivotally mounted yoke 48 which in turn is connected through an upright shaft 49 slidably movable in the rotor column 51 of the helicopter to the lift rotor structure generally designated 52. In this regard, up or down vertical movement of the rod 49 in the rotor column 51 effects movement of pitch change rods 53 and 54 in the known manner to increase or decrease in unison the pitch of the rotor blades 56 mounted for rotaiton above the helicopter.

As noted previously the exact collective pitch change arrangement operatively connecting the pitch change control stick 1 with the lift rotor blades may vary in accordance with general knowledge in the art. However, a pitch change operating linkage of the type generally shown in FIG. 4 of the aforementioned patent may be effectively employed. In this regard, although forming no part of this invention, a portion of a helicopter rotor blade cyclic pitch change mechanism as disclosed in that patent is also shown in FIG. 3, and has generally been designated 57.

As also seen in FIG. 3, the helicopter power source comprises an engine 61 mounted on the chassis of the helicopter. The engine is surmounted by a transmission generally designated 62 which effects rotation of the rotor shaft 51 and rotor head 52 therewith in the manner well known and as described in the aforementioned patent. Also, in known fashion the tail rotor 63 mounted on the tail boom 64 of the helicopter is driven through a tail rotor drive shaft connection 66 from the transmission 62 in the known fashion.

In conjunction with the engine 61 are the aforementioned governor 7 and carburetor 31 in which a butterfly valve member 33 is rotatably positioned so as to be actuated upon abrupt movement of the collective pitch control stick 1 in the manner described previously with respect to the control system shown in FIG. 2.

As a result of the constructions disclosed herein, because of the dash pot induced rapid response of the throttle valve setting, the over-shooting or hunting of governors common heretofore which resulted from the transient responses of the governors is greatly minimized and substantially eliminated. Also, because the dash pot structure is substantially inoperative upon slow collective pitch changes being effected, the governors conventionally employed with the control system are operable in their usual fashion during relatively slow pitch changes when anticipation of and rapid output power changes are not required.

Another important feature of the invention resides in the fact that pivotal movement of the collective pitch control member in the manner described introduces work directly into the governor control system. As a result, the work required from the governor is reduced. This results in the governor being capable of overcoming more readily the frictional drag normally resulting from movement of the control linkages, the throttle valve, and so forth. Therefore, less work load is placed upon the governor so that a more efficient operation is effected. This permits use in the control system of a governor which possesses lower work output potential than a governor which would normally be employed in the absence of the disclosed dash pot structure.

Having made a full disclosure of preferred embodiments of this invention, modifications thereto which may become evident from reading this disclosure are intended to be included herein, in accordance with the scope of the appended claims.

I claim:

1. A helicopter comprising an engine having a throttle valve therein, rotor blades rotatably mounted on said helicopter and drivingly connected to said engine, and a control system for said helicopter; said control system comprising a governor, means between said governor and said throttle valve of said engine operatively connecting said governor and said valve together, said governor normally automatically regulating the setting of said throttle valve in response to changing flight conditions of said helicopter, and pilot operable mechanism superimposable on said governor for selectively and rapidly modifying the setting of said throttle valve independently of said governor during the time normally required by said governor to sense changing flight conditions and to effect a valve setting change in response thereto during flight of said helicopter; said mechanism comprising a pilot operable collective pitch control member operatively connected with the rotor blades of said helicopter for changing collectively the pitch thereof, and linear fluid coupling means operatively interconnecting said control member with said governor and with said throttle valve, said coupling means comprising a fluid dash pot operatively interposed between said control member and said means which operatively connects said governor with said throttle valve, said dash pot being effective in direct response to rapid movement of said control member to modify the setting of said throttle valve during the interval while said governor is responding to the change in flight conditions which result from such movement, said dash pot being generally ineffective upon gradual movement of said control member to modify the setting of said throttle valve so that said governor exclusively controls said valve setting during such gradual movement.

2. A helicopter comprising an engine having a throttle valve therein, rotor blades rotatably mounted on said helicopter and drivingly connected to said engine, and a control system for said helicopter; said control system comprising a governor, linkage means extending from said governor and operatively connecting the same with said throttle valve of said engine so that said governor is normally adapted to automatically regulate the setting of said throttle valve in response to changing flight conditions of said helicopter, and pilot operable mechanism superimposable on said governor for selectively and rapidly modifying the setting of said throttle valve independently of said governor during the time normally required by said governor to sense changing flight conditions and to effect a valve setting change in response thereto during flight of said helicopter; said mechanism comprising a pilot operable collective pitch control member operatively connected with the rotor blades of said helicopter for changing collectively the pitch thereof, and non-rigid linear fluid coupling means operatively interconnecting said control member with said governor and with said throttle valve, said coupling means comprising a fluid dash pot operatively interposed between said control member and said linkage means, said dash pot being effective in direct response to rapid movement of said control member to modify the setting of said throttle valve during the interval while said governor is responding to the change in flight conditions which result from such movement, said dash pot being generally ineffective upon gradual movement of said control member to modify the setting of said throttle valve so that said governor exclusively controls said valve setting during such gradual movement; said dash pot comprising a fluid containing cylinder operatively connected with said control member, and a piston member slidably received in said cylinder, said piston member being operatively connected with said linkage means, rapid movement of said piston in response to rapid movement of said cylinder effecting movement of said linkage means and a corresponding change in the setting of said throttle valve.

References Cited in the file of this patent

UNITED STATES PATENTS

| | | |
|---|---|---|
| 2,476,063 | Ridgley et al. | July 12, 1949 |
| 2,499,813 | Brady | Mar. 7, 1950 |
| 2,640,551 | Plumb | June 2, 1953 |
| 2,664,958 | Danick | Jan. 5, 1954 |
| 2,781,856 | Danvers | Feb. 19, 1957 |
| 2,796,136 | Mock | June 18, 1957 |
| 2,957,687 | Chillson et al. | Oct. 25, 1960 |
| 3,006,145 | Sobey | Oct. 31, 1961 |

FOREIGN PATENTS

| | | |
|---|---|---|
| 247,912 | Switzerland | Jan. 16, 1948 |
| 586,478 | Canada | Nov. 3, 1959 |
| 790,560 | Great Britain | Feb. 12, 1958 |
| 1,206,264 | France | Aug. 24, 1959 |